No. 739,280. Patented September 22, 1903.

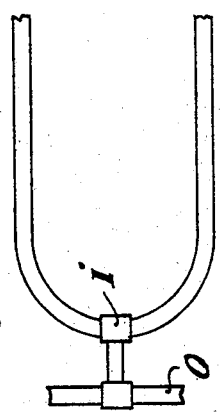
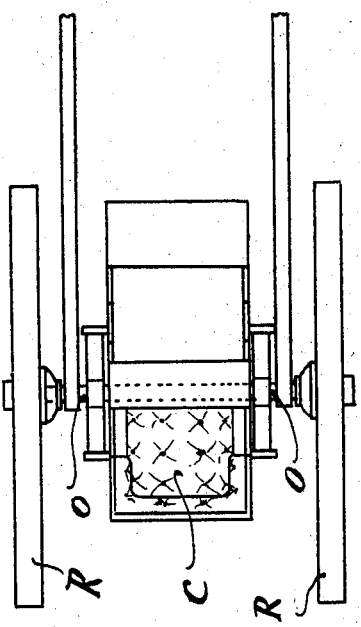
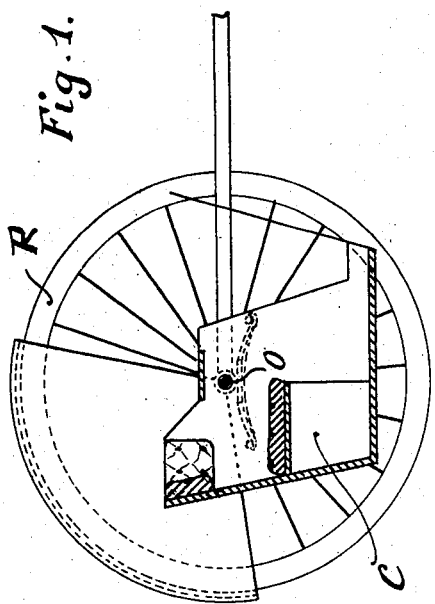

UNITED STATES PATENT OFFICE.

ALEXIS BEURRIER, OF MONTGUYON, FRANCE.

ROAD-VEHICLE.

SPECIFICATION forming part of Letters Patent No. 739,280, dated September 22, 1903.

Application filed February 4, 1902. Serial No. 92,561. (No model.)

*To all whom it may concern:*

Be it known that I, ALEXIS BEURRIER, of Montguyon, in the Republic of France, have invented new and useful Improvements in Road-Vehicles, of which the following is a specification.

This invention for improvements in road-vehicles has for its object to provide a two-wheeled vehicle for horse traction in which the center of gravity of the vehicle-body is well below the axle, so that it cannot be overturned, and also to provide means whereby the pull is exerted directly on the axle.

In the accompanying drawings, Figure 1 is a sectional elevation, and Fig. 2 a plan, of a road-vehicle constructed according to this invention. Fig. 3 is a plan of the shafts, showing another way of securing them to the axle.

According to this invention the vehicle comprises two wheels R of large diameter and a body which is very low down, just clear of the ground, so as to pass over obstacles that may be met with on the road, and suspended from the axle O by bow-springs or spiral springs, so that it hangs below the axle after the manner of a swing. The traction is direct from the axle and not from the body, a carriage-pole running from the center of the axle and being used for putting a couple of horses to. Shafts for a single horse may be connected with the axle, the said shafts being fastened to the horse's collar by means of a hook with a spring attachment for deadening the action of the collar in the direction of traction.

These carriages may be made with either one or more seats. In those with one or two seats only the seat is placed low down and behind the axle. The persons using the vehicle get in from behind. In this case the two shafts may be fixed near the end of the axle.

The form and design of the vehicle-body may be varied to any extent.

With a carriage of the above-described form of construction accidents from falls and overturning are avoided, greater facilities afforded for getting in and out of the carriage, no carriage-step being required, and the comfort of the passengers insured by the absence of jolting and jerking caused by the horse's trotting action, and very easy running of the vehicle. As regards the horse a part of the strain of pull is got rid of. There is no saddle, back-strap, or belly-band. Thus the horse's body is free and there is no upward tugging, even in hilly country.

I claim—

1. In a two-wheeled road-vehicle the combination with the wheels and axle of springs supported from the axle, a body arranged below the axle and suspended from the springs, and shafts connected directly to the axle, substantially as described.

2. In a two-wheeled road-vehicle the combination with the wheels and axle of springs supported from the axle, a body arranged below the axle and suspended from the springs, and a pole connected to the center of the axle, substantially as described.

In testimony whereof I have affixed my signature in presence of two witnesses.

ALEXIS BEURRIER.

Witnesses:
 LOUIS FICOT,
 EUGENE CAMPBELL.